(12) United States Patent
Ma et al.

(10) Patent No.: US 12,389,253 B2
(45) Date of Patent: Aug. 12, 2025

(54) MONITORING METHOD AND DEVICE

(71) Applicant: SZ DJI TECHNOLOGY CO., LTD., Shenzhen (CN)

(72) Inventors: Ning Ma, Shenzhen (CN); Cangbo Zhao, Shenzhen (CN); Ying Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 942 days.

(21) Appl. No.: 16/995,294

(22) Filed: Aug. 17, 2020

(65) Prior Publication Data

US 2020/0382983 A1 Dec. 3, 2020

Related U.S. Application Data

(63) Continuation of application No. PCT/CN2018/076971, filed on Feb. 22, 2018.

(51) Int. Cl.
*H04W 24/10* (2009.01)
*G05D 1/00* (2024.01)
*H04W 72/044* (2023.01)
*H04W 72/542* (2023.01)

(52) U.S. Cl.
CPC .......... *H04W 24/10* (2013.01); *G05D 1/0022* (2013.01); *G05D 1/101* (2013.01); *H04W 72/044* (2013.01); *H04W 72/542* (2023.01)

(58) Field of Classification Search
CPC . H04W 24/10; H04W 72/044; H04W 72/542; H04W 4/029; H04W 4/44; G05D 1/0022; G05D 1/101; G05D 1/10; H04B 7/18506; G08C 17/02

See application file for complete search history.

(56) References Cited

U.S. PATENT DOCUMENTS

| | | | |
|---|---|---|---|
| 9,646,502 B1* | 5/2017 | Gentry | G06F 21/44 |
| 2015/0163671 A1* | 6/2015 | Stanforth | H04W 16/14 |
| | | | 455/411 |
| 2016/0363929 A1* | 12/2016 | Clark | G08G 5/0034 |
| 2017/0092109 A1* | 3/2017 | Trundle | G08B 25/006 |
| 2017/0325221 A1* | 11/2017 | Jalali | H04W 16/28 |
| 2018/0176841 A1* | 6/2018 | Sankaranarayan | H04W 36/365 |
| 2018/0183496 A1* | 6/2018 | Gasnier | G05D 1/0038 |
| 2018/0262449 A1* | 9/2018 | Erceg | H04L 1/1867 |
| 2018/0276998 A1* | 9/2018 | Yu | G08G 5/0026 |

(Continued)

FOREIGN PATENT DOCUMENTS

| | | |
|---|---|---|
| CN | 103379336 A | 10/2013 |
| CN | 103543752 A | 1/2014 |

(Continued)

OTHER PUBLICATIONS

The World Intellectual Property Organization (WIPO) International Search Report and Written Opinion for PCT/CN2018/076971 Nov. 12, 2018 6 pages.

*Primary Examiner* — Stella L. Woo
(74) *Attorney, Agent, or Firm* — ANOVA LAW GROUP, PLLC

(57) ABSTRACT

A monitoring method includes effecting communication of working data associated with normal operations of a communication device at a first frequency channel and transmitting monitoring data associated with monitoring the communication device at a second frequency channel.

19 Claims, 3 Drawing Sheets

(56) References Cited

U.S. PATENT DOCUMENTS

| | | | |
|---|---|---|---|
| 2019/0045454 A1* | 2/2019 | Haran | H04W 72/541 |
| 2019/0077508 A1* | 3/2019 | Shimezawa | B64D 45/00 |
| 2022/0106036 A1* | 4/2022 | Kuehn | G05D 1/0684 |

FOREIGN PATENT DOCUMENTS

| | | | |
|---|---|---|---|
| CN | 104661228 A | 5/2015 | |
| CN | 105242686 A | 1/2016 | |
| CN | 205103662 U | 3/2016 | |
| CN | 105739520 A | 7/2016 | |
| CN | 105794290 A | 7/2016 | |
| CN | 106873404 A | 6/2017 | |
| CN | 106873618 A | 6/2017 | |
| CN | 107223223 A | 9/2017 | |
| CN | 107533788 A | 1/2018 | |
| GB | 2568421 A | 5/2019 | |
| GB | 2569789 A | 7/2019 | |
| WO | 2015051616 A1 | 4/2015 | |
| WO | 2017185106 A1 | 10/2017 | |
| WO | WO-2017196213 A1 * | 11/2017 | G05D 1/0022 |
| WO | 2018014338 A1 | 1/2018 | |

\* cited by examiner

Effecting communication of working data associated with normal operations of a communication device at a first frequency channel — S402

Transmitting monitoring data associated with monitoring the communication device at a second frequency channel — S404

MONITORING METHOD AND DEVICE

CROSS-REFERENCE TO RELATED APPLICATION

This application is a continuation of International Application No. PCT/CN2018/076971, filed Feb. 22, 2018, the entire content of which is incorporated herein by reference.

TECHNICAL FIELD

The present disclosure relates to communication technologies and, more particularly, to a monitoring method and device using multiple communication circuits.

BACKGROUND

As the use of aerial vehicles such as unmanned aerial vehicles (UAVs) has become more prevalent, safety issues and challenges arise. For instance, UAVs systems may potentially be used for invading privacy, or carrying out terrorist and/or criminal activities. There is a need for detecting and monitoring activities of UAVs.

Conventional methods of detecting or monitoring a UAV include, for example, using a radar for detecting an object, which is limited by the UAV size or material of the UAV; recognizing a sound generated by a UAV, which requires a large amount of data processing; and performing visual detection techniques, which does not work well in distinguishing a UAV from other movable objects.

SUMMARY

In accordance with the present disclosure, there is provided a monitoring method. The method includes effecting communication of working data associated with normal operations of a communication device at a first frequency channel and transmitting monitoring data associated with monitoring the communication device at a second frequency channel.

Also in accordance with the present disclosure, there is provided a device including a first communication circuit configured to effect communication of working data associated with normal operations of the device at a first frequency channel and a second communication circuit configured to transmit monitoring data associated with monitoring the device at a second frequency channel.

DESCRIPTION OF THE EMBODIMENTS

Figure 1:
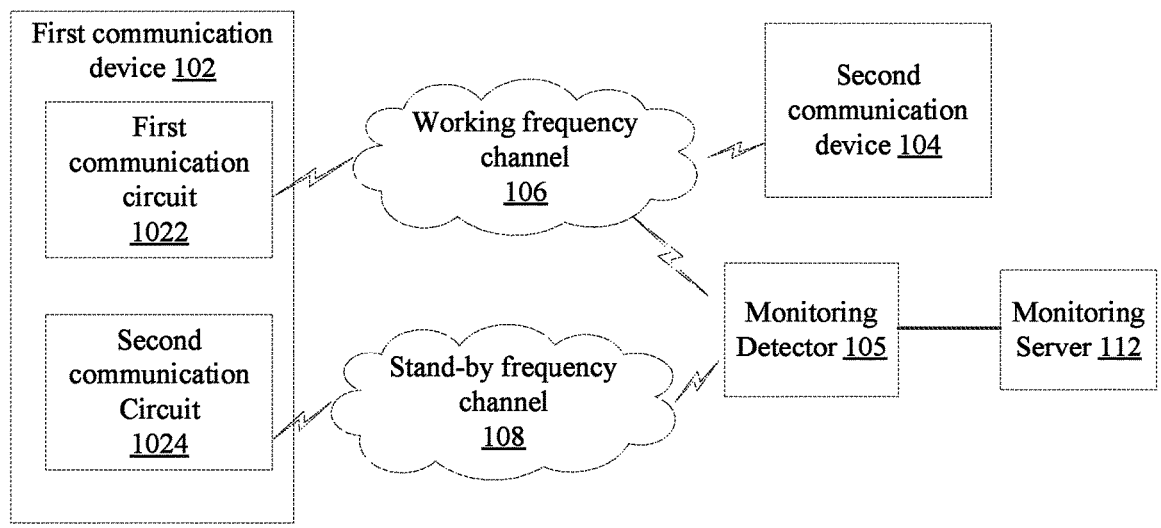
FIG. 1 is a schematic block diagram showing an operating environment according to exemplary embodiments of the present disclosure.

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

The present disclosure provides devices, methods, and systems related to detecting and monitoring a mobile object. The present disclosure is applicable to methods and devices that employ multiple communication standards. Specifically, a monitoring method based on a device operating in multiple frequency channels in one or more frequency bands is provided.

A frequency band, as used herein, may refer to a range of the spectrum in radio communication frequencies. The frequency band may be referred to by its frequency range or its characteristic frequency, such as the central frequency, representative frequency, typical frequency, or most-frequently used frequency in the frequency band. For example, Wi-Fi networks primarily operate in the 2.4-GHz band and 5-GHz band. A frequency band can include multiple frequency channels. A frequency channel, as used herein, refers to a wireless communication channel that operates at a center frequency with a designated bandwidth. A frequency channel may be referred by a channel number/code in the frequency band that it belongs, or by its center frequency.

When a communication device in a mobile object wirelessly broadcasts monitoring data, the monitoring data can be received by a monitoring/supervision center, such that activities related to the mobile object can be monitored. In a communication device that includes at least two communication circuits, a desired communication circuit is selected adaptively for data communication. In existing technologies, while the selected communication circuit is operating, the other communication circuit does not operate at all at the same time. In other words, in the existing technologies, the operating communication circuit needs to transmit and/or receive both working data related to normal operations of the mobile object and the monitoring data. The working data includes data associated with normal operations of the mobile object and, for example, may include operational data initiated or generated by the mobile object or a load carried by the mobile object (such as images captured by an onboard camera or attitude data generated by, e.g., onboard sensors), which can be transmitted to a remote control of the mobile object, or may include movement adjustment signal received from the remote control. The monitoring data includes data directed to, e.g., reporting current status of the mobile object to a monitoring/regulatory entity that oversees activities of mobile object, such as UAVs, in a specific region, i.e., data useful for monitoring the mobile object. The monitoring data may include, for example, identification information or location information of the mobile object, which can be transmitted to the regulatory entity. Transmission of the monitoring data may occupy time and resources of regular communication operations of the mobile object (e.g., communications with the remote control), increase load on the network, and reduce throughput of regular operation data for the remote control, which can impact the performance of the mobile object. Further, different wireless communication systems employed by the communication device may have different transmit power and different configurations for the monitoring data, thus having different effective ranges for broadcasting the monitoring data. That is, using a wireless communication system with a lower transmit power and/or a lower effective range may undermine monitor effects.

Consistent with the present disclosure, two communication circuits may operate at the same time. For example, one of the communication circuits can perform working data communication and can be referred to as "working communication circuit." Meanwhile, the other one of the communication circuits can transmit monitoring data and can be referred to as "monitoring communication circuit."

FIG. 1 is a schematic block diagram showing an operating environment 100 according to exemplary embodiments of the present disclosure. As shown in FIG. 1, the exemplary operating environment 100 includes a first communication device 102, a second communication device 104, and one or more monitoring detectors 105. The first communication device 102 can be a communication device arranged on or carried by a mobile object, or can be the mobile object itself.

Specifically, the first communication device 102 includes a first communication circuit 1022 and a second communication circuit 1024. The first communication circuit 1022 and the second communication circuit 1024 may support same or different wireless communication standards/protocols. For example, one of the first communication circuit 1022 and the second communication circuit 1024 may implement a standard public communication protocol (e.g., Wi-Fi IEEE 802.11 standard or WiMAX IEEE 802.16 standard), and the other one may implement a proprietary communication technology such as software defined radio (SDR) protocol. Any proper communication protocols may be supported by the communication circuits 1022 and 1024, such as SDR, Wi-Fi, Bluetooth, Zigbee, LTE, GPRS, GSM, CDMA, etc.

Each of the first communication circuit 1022 and the second communication circuit 1024 can, for example, be a chip or part of the chip including an integrated circuit. The first communication circuit 1022 and the second communication circuit 1024 may be located in a same housing in the first communication device 102, or separately at different parts of the first communication device 102. In some embodiments, the first communication device 102 further includes an internal data exchange mechanism/interface between the first communication circuit 1022 and the second communication circuit 1024. That is, the first communication circuit 1022 and the second communication circuit 1024 are connected to each other directly or indirectly such that a monitoring data transmission scheme and/or commands received from the one or more monitoring detector 105 can be communicated between the first communication circuit 1022 and the second communication circuit 1024. The connection interface between the first communication circuit 1022 and the second communication circuit 1024 can be any interface that is suitable for coupling two circuits. For example, the connection interface can be a Universal Serial Bus (USB) interface, a High-Definition Multimedia Interface (HDMI), or a wireless link, such as a Wi-Fi link, a Bluetooth link, or a near-field communication link.

In an exemplary embodiment, the first communication device 102 is configured to, when one of the first communication circuit 1022 and the second communication circuit 1024 is performing working data communication, instruct the other one of the first communication circuit 1022 and the second communication circuit 1024 to transmit monitoring data in a channel not used by the working data communication. For illustrative purposes, the first communication circuit 1022 is considered as the one performing the working data communication through a working frequency channel 106, and the second communication circuit 1024 is considered as the one transmitting the monitoring data through a stand-by frequency channel 108. That is, having two communication circuits operating at the same time for different purposes, the first communication device 102 can achieve transmitting the monitoring data in the stand-by frequency channel 108 (e.g., by the second communication circuit 1024) substantially concurrently with effecting working data communication with the second communication device 104 at the working frequency channel 106 (e.g., by the first communication circuit 1022). For example, the first communication device 102 may transmit monitoring data at the stand-by frequency channel 108 during, shortly before (e.g., within about 1 millisecond before), or shortly after (e.g., within about 1 millisecond after) the working data communication with the second communication device 104 at the working frequency channel 106.

That is, the first communication circuit 1022 is configured to effect communication of the working data with the second communication device 104 at the working frequency channel 106, i.e., transmitting and/or receiving working data to and/or from the second communication device 104 through the working frequency channel 106. The working data can include, for example, status information, sensor information, and/or controlling information related to the first communication device 102 and/or the second communication device 104. In some embodiments, the first communication device 102 can, through the first communication circuit 1022, transmit image data captured by an onboard camera and/or power level detected by an onboard sensor to the second communication device 104 at the working frequency channel 106. In some embodiments, the first communication device 102 can, through the first communication circuit 1022, receive movement adjustment signal from the second communication device 104 at the working frequency channel 106, such that the first communication device 102 can change movement direction/speed/altitude based on the received adjustment signal.

In some embodiments, the second communication device 104 (e.g., a remote control of the mobile object) is exclusively paired with the first communication device 102 (e.g., the mobile object or carried by the mobile object) before the first communication device 102 starts normal operation (e.g., the mobile object operates/functions in accordance with control instructions from the remote control), such that the working data is communicated between the two devices for regular operations. The monitoring data, on the other hand, is communicated with one or more monitoring detectors 105, after the first communication device 102 starts the normal operation with the second communication device 104. A monitoring detector 105 may receive monitoring data reported by multiple first communication devices 102 or other similar mobile objects having communication capabilities within a signal reception coverage range of the monitoring detector 105.

The second communication circuit 1024 may transmit monitoring data at the stand-by frequency channel 108 (i.e., a frequency channel that is different from the working frequency channel 106), such that the monitoring data can be received by one of the one or more monitoring detectors 105 within a range of the second communication circuit 1024. The monitoring data can include, for example, data about a location of the first communication device 102 and/or a location of the second communication device 104.

In some embodiments, the first communication circuit 1022 may further transmit the monitoring data along with the working data at the working frequency channel 106 such that the monitoring data can be received by one of the one or more monitoring detectors 105 within the range of the first communication circuit 1022.

In some embodiments, the monitoring data is transmitted cyclically with fixed time intervals or variable time intervals. In some embodiments, the monitoring data is transmitted in response to a probe request generated by the one or more detectors 105.

In some embodiments, the monitoring data is not encrypted. In some other embodiments, the monitoring is encrypted using a key known to the one or more monitoring detectors 105.

In some embodiments, the monitoring data may be transmitted by hopping over any number of frequency channels. Such frequency-hopping mechanism can provide resistance against interference. In some embodiments, when one or both of the first communication circuit 1022 and the second communication circuit 1024 are transmitting the monitoring data using multiple frequency channels, all frequency channels 106 utilized by the first communication circuit 1022 are different from all frequency channels 108 utilized by the second communication circuit 1024. For example, the first communication circuit 1022 can utilize first frequency channel(s) in a first frequency band, and the second communication circuit 1024 can operate at second frequency channel(s) in a second frequency band which is different from the first frequency band.

In some embodiments, the first communication device 102 can employ a monitoring data transmission scheme that assigns one or both of the first communication circuit 1022 and the second communication circuit 1024 to transmit the monitoring data at their respective operation frequency channels. The monitoring data transmission scheme may further include any applicable configuration for transmitting the monitoring data using the corresponding communication circuit, such as type(s) of contents to be included in the monitoring data, modulation method of the monitoring data, encoding scheme of the monitoring data, time or frequency for transmitting the monitoring data, and/or frequency channel for transmitting the monitoring data. Further, when the first communication circuit 1022 and the second communication 1024 are both assigned to transmit the monitoring data, some or all of the configurations for transmitting the monitoring data by the first communication circuit 1022 may be different from the configurations for transmitting the monitoring data by the second communication circuit 1024.

In some embodiments, the monitoring data transmission scheme may assign the first communication circuit 1022 to transmit the monitoring data. For example, the monitoring data is inserted into one or more data transmission units that include at least a portion of the working data. A data transmission unit, as used herein, may refer to a data unit having a specific data structure (e.g., defined sequence of bits, content fields, length, etc.) for being transmitted in compliance with a corresponding communication protocol. A data transmission unit may include one or more data transmission frames, one or more subframes, or any other types of data structures. In some cases, the monitoring data is transmitted differently than the portion of the working data in the one or more transmission units in at least one of the working frequency band, modulation schemes, data formats and communication protocols. In some cases, the portion of the working data may be deciphered by the second communication device 104 but not by the one or more monitoring detectors 105. In some cases, the monitoring data is transmitted using a downlink and/or an uplink between the first communication device 1022 and the second communication device 1024.

The first communication circuit 1022 may allocate a frame or a subframe in a data transmission unit for placing the monitoring data, and schedule specific time slots for transmitting the monitoring data. For example, the monitoring data can be transmitted at time intervals T. The time interval T can be divided into two time slots: T1 and T2. Time slot T1 is designated for transmitting the monitoring data and time slot T2 is designated for transmitting the working data. Time slot T1 corresponds to a length of the monitoring data. That is, if the monitoring data has shorter length, less time is required to be assigned for transmitting the monitoring data. In some embodiments, reducing the time interval T and/or shortening the time slot T1 by the first communication circuit 1022 can lower the impact of transmission of the monitoring data posed on transmission of the working data between the first communication device 102 and the second communication device 104.

In some embodiments, the monitoring data may be generated in the form of a datagram. The datagram can be transmitted using a data transmission unit. The data transmission unit may include a data transmission frame such as a management frame, a subframe, or a plurality of subframes or frames. The datagram may include a plurality of sub-datagrams such that the data transmission unit includes one or more of the sub-datagrams. In some instances, each sub-datagram includes at least an index for the one or more monitoring detectors 105 to reconstruct the datagram. The data transmission unit may have a fixed length or a variable length.

In some embodiments, the management frame is transmitted using a Wi-Fi communication channel (e.g., by the second communication circuit 1024 or the first communication circuit 1022) under 802.11 standards. In some embodiments, the management frame is a broadcasting frame. The broadcasting frame includes a beacon frame or a probe request frame. In some embodiments, the management frame is a probe response frame and is transmitted in response to a probe request generated by the monitoring detector 105.

In some other embodiments, the datagram is transmitted using software-defined radio (SDR) techniques. For example, information about the time slot or the one or more frequency channels are specified by the SDR techniques and may be known to one or more monitoring detectors 105. The datagram may be transmitted in the time division duplex (TDD) mode or frequency division duplex (FDD) mode. In some cases, a sequence of the monitoring subframes are transmitted using frequency hopping on multiple frequencies and a frequency hopping pattern is known to the one or more monitoring detectors 105. In some instances, the frequency hopping pattern is uniquely associated with an identity of the mobile object. Frequency hopping may occur at slot level or subframe level. For example, two monitoring subframes may be transmitted at different frequency channels.

A monitoring detector 105 can pick up the monitoring data transmitted from the first communication device 102 when the first communication device 102 is within a range of the monitoring detector 105. In some embodiments, the monitoring detector 105 can receive monitoring data sent in different communication modes and/or different communication standards/protocols.

The one or more monitoring detectors 105 can operate at the stand-by frequency channel 108 to receive the monitoring data. In some embodiments, the one or more monitoring detectors 105 can further operate at the working frequency channel 106 to receive the monitoring data.

In some embodiments, the monitoring detector 105 may be configured to scan one or more frequency channels to detect the monitoring data. In some embodiments, the monitoring detector 105 may be configured to obtain subsequent monitoring data when first monitoring data is detected at a specific frequency channel. For example, the first monitoring data may include information related to the transmission of the monitoring data such as allocation or scheduling of the monitoring data. The monitoring detector 105 may be configured to determine which frequency channel(s) to continue to listen or determine the scheduling of obtaining subsequent monitoring data according to such information. In one example, the monitoring detector 105 may continue to listen on the same frequency channel (e.g., when the monitoring data is transmitted based on Wi-Fi communication protocol) for receiving subsequent monitoring data. In another example, the monitoring detector 105 may continue to scan multiple predetermined frequency channels to obtain a sequence of monitoring data transmitted using frequency hopping scheme (e.g., based on a software defined radio protocol).

In some embodiments, the monitoring detector 105 may not be in direct communication with the second communication device 104. In some embodiments, the monitoring detector 105 can further transmit command data to the first communication device 102. In some embodiments, a plurality of the monitoring detectors 105 can be organized into zones to individually or collectively detect and monitor the first communication device 102 in certain areas/spaces. The monitoring detector 105 may be deployed in any designated monitored region or space, such as an airport, a government property, a factory, a private residence, etc. In some embodiments, the monitoring detector 105 may be a communication device integrated in another mobile object. In some embodiments, the monitoring detector 105 may be a mobile device such as a smartphone, a tablet, a laptop computer, etc.

In some embodiments, the one or more monitoring detectors 105 can be connected to a monitoring server 112. The monitoring server 112 can, in accordance with the monitoring data received from the one or more monitoring detectors 105 and/or the command data sent by the one or more monitoring detectors 105, monitor and regulate activities related to the first communication device 102 and/or the second communication device 104, such as: obtaining a location of the first communication device 102 and/or the second communication device 104, assessing a risk level related to the first communication device 102 and/or the second communication device 104, and sending controlling commands to the first communication device 102 and/or the second communication device 104 (e.g., according to regulation rules). In some embodiments, certain functionalities of the monitoring server 112 described herein may also be implemented by the monitoring detector 105.

In some embodiments, the monitoring server 112 can receive the monitoring data collected by the one or more monitoring detectors 105, decrypt the monitoring data if necessary, and analyze the monitoring data (e.g., parsing based on certain demodulation/decoding scheme) to obtain information related to the mobile object. The monitoring server 112 may further access a database that stores regulatory rules and identification of registered mobile objects, and according to information from the database, verify an identity corresponding to the first communication device 102, determine whether a status of the first communication device 102 indicated by the monitoring data conforms with the regulatory rules, and generate a warning message if irregular activities are spotted.

In some embodiments, the monitoring server 112 may further generate commands for controlling the first communication device 102 or an entity related to the first communication device 102. The monitoring server 112 may send the commands to the monitoring detector 105 such that the commands are transmitted by the monitoring detector 105 and received by the first communication device 102. For example, the command may adjust movement of a mobile object related to the first communication device 102, present a warning message on the second communication device 104, or switch a communication frequency channel of the first communication device 102.

Figure 2:
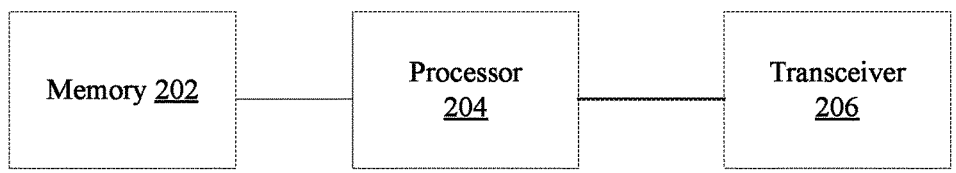
FIG. 2 is a schematic block diagram of a communication device according to exemplary embodiments of the present disclosure.

The first communication device 102, the second communication device 104, the one or more monitoring detector 105, and/or the server 112 can be implemented by any appropriate communication device. FIG. 2 is a schematic block diagram of a communication device 200 according to exemplary embodiments of the present disclosure. As shown in FIG. 2, the communication device 200 includes at least one processor 204, at least one memory 202, and at least one transceiver 206. According to the disclosure, the at least one processor 204, the at least one memory 202, and the at least one transceiver 206 can be separate devices, or any two or more of them can be integrated in one device.

The at least one memory 202 can include a non-transitory computer-readable storage medium, such as a random-access memory (RAM), a read only memory, a flash memory, a volatile memory, a hard disk storage, or an optical medium. The at least one memory 202 coupled to the at least one processor 204 may be configured to store instructions and/or data. For example, the at least one memory 202 may be configured to store information related to communication standards supported by the communication device 200, computer executable instructions for implementing data communication process, or the like.

The at least one processor 204 can include any suitable hardware processor, such as a microprocessor, a microcontroller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component. The at least one memory 202 stores computer program codes that, when executed by the at least one processor 204, control the at least one processor 204 and/or the at least one transceiver 206 to perform a communication method consistent with the disclosure, such as one of the exemplary communication methods described below. In some embodiments, the computer program codes also control the at least one processor 204 to perform some or all of the functions that can be performed by the first communication device 102, the second communication device 104, the monitoring detector 105, or the monitoring server 112 as described above, each of which can be an example of the communication device 200.

The at least one transceiver 206 is controlled by the at least one processor 204 for transmitting data to and/or receiving data from another device. The at least one transceiver 206 may include any number of transmitters and/or receivers suitable for wired and/or wireless communication. The transceiver 206 may include one or more antennas for wireless communication at any supported frequency channel. In some embodiments, the at least one transceiver 106 is configured to operate at the working frequency channel 106 for transmitting and receiving working data and/or monitoring data, and/or operate at the stand-by frequency channel 108 for transmitting and receiving monitoring data.

The processor can be any type of processor, the memory can be any type of memory, and the transceiver can be any type of transceiver. The disclosure is not limited thereto.

The communication device 200 can implement the first communication circuit 1022 and/or the second communication circuit 1024 of the first communication device 102. In some embodiments, the first communication circuit 1022 and the second communication circuit 1024 may each include a set of processor, memory, and wireless transceiver. In some other embodiments, the first communication circuit 1022 and the second communication circuit 1024 may share a same processor, memory, and/or wireless transceiver. In some embodiments, the first communication device 102 may include additional processor, memory, connection interface, and/or other hardware components for coordinating collaborations between the first communication circuit 1022 and the second communication circuit 1024.

In some embodiments, the at least one processor 204, coupled to the at least one memory 202 and the at least one transceiver 206, may be configured to obtain channel information through channel estimation. The channel information may include, but is not limited to, e.g., the SNR, SNIR, BER, CQI, transmission latency, channel bandwidth, and/or the like. The channel information can be estimated using pilot data and/or received data based on different channel estimation schemes. The channel estimation scheme can be chosen according to the required performance, computational complexity, time-variation of the channel, and/or the like.

Figures 3, 4:
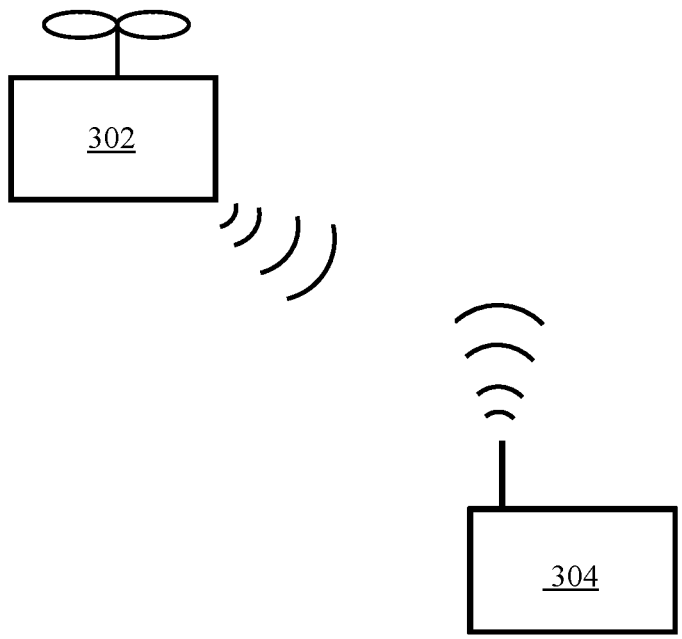
FIG. 3 a schematic diagram showing a mobile object and a remote control according to an exemplary embodiment of the present disclosure.
FIG. 4 is a flow chart of a monitoring method according to an exemplary embodiment of the present disclosure.

FIG. 3 a schematic diagram showing a mobile object 302 and a remote control 304 according to an exemplary embodiment of the present disclosure. The mobile object 302 can be, for example, an unmanned aerial vehicle (UAV), a driverless car, a mobile robot, a driverless boat, a submarine, a spacecraft, a satellite, a mobile phone, a tablet, a laptop, a wearable device, a digital camera, or the like. In some embodiments, the first communication device 102 may be the mobile object 302 or may be integrated in or carried by the mobile object 302. The remote control 304 may be a remote controller or a terminal device with an application (app) that can control the first communication device 102 and/or the mobile object 302. The terminal device can be, for example, a smartphone, a tablet, a game device, or the like. The second communication device 104 may be the remote control 304 or may be integrated in the remote control 304.

In some other embodiments, the second communication device 104 may be a hosted payload carried by the mobile object 302 that operates independently but may share the power supply of the mobile object 302. In some other embodiments, the second communication device 104 may be provided in another mobile object, such as a UAV, a driverless car, a mobile robot, a driverless boat, a submarine, a spacecraft, a satellite, a mobile phone, a tablet, a laptop, a wearable device, a digital camera, or the like.

In some other embodiments, the second communication device 104 may be integrated in the mobile object 302, and the first communication device 102 may be integrated in the remote control 304, the payload, or the other mobile object.

In some embodiments, the working data transmitted between the first communication device 102 and the second communication device 104 may include data collected by sensors onboard the mobile object 304 (such as image data, GPS data, movement data, power level), information related to a communication channel between the mobile object 302 and the remote control 304, and/or operation commands from the remote control 304 (such as adjusting moving path, adjusting posture/position, operation to payload, zooming in/out an onboard camera, powering on/off an onboard sensor).

In some embodiments, the monitoring data transmitted from the first communication device 102 can include dynamic data (e.g., real-time data) related to the mobile object 302 and/or information indicating a physical state of the mobile object 302, such as a location of the mobile object 302 (e.g., detected by onboard GPS sensor), a location of the remote control 304, a speed of the mobile object 302, an orientation of the mobile object 302, etc. For example, when the mobile object 302 is a UAV, the monitoring data may include a latitude, longitude, and/or altitude of the UAV, flight distance of the UAV (e.g., distance from the remote control 304), and flight time of the UAV. In some embodiments, the monitoring data can include identification information related to the mobile object 302, such as an identifier of the mobile object 302, an identity of an owner of the mobile object 302, a type of the mobile object 302, an identifier of the remote control 304, etc. In some embodiments, the monitoring data can include control data (e.g., a control signal from a monitoring detector to change moving course of the mobile object), sensor data (e.g., data collected by on board sensors of the mobile object), telemetry data (e.g., altitude and/or speed of the mobile object), or payload data (e.g., data related to a payload carried by the mobile object) of the mobile object 302.

Figure 5:
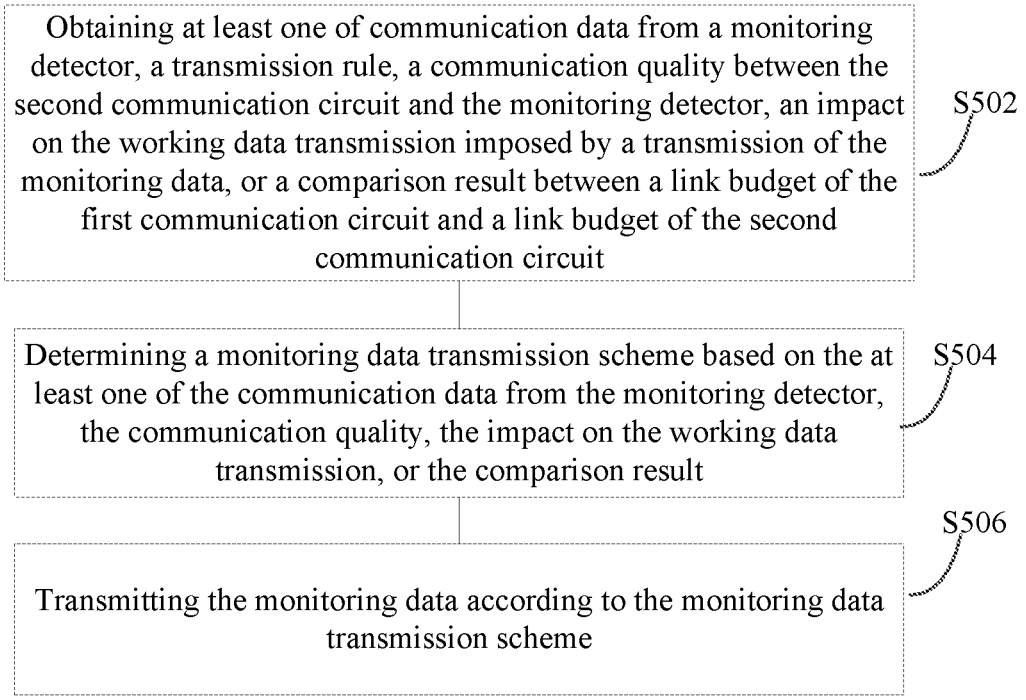
FIG. 5 is a flow chart of a monitoring method according to an exemplary embodiment of the present disclosure.
Figure 6:
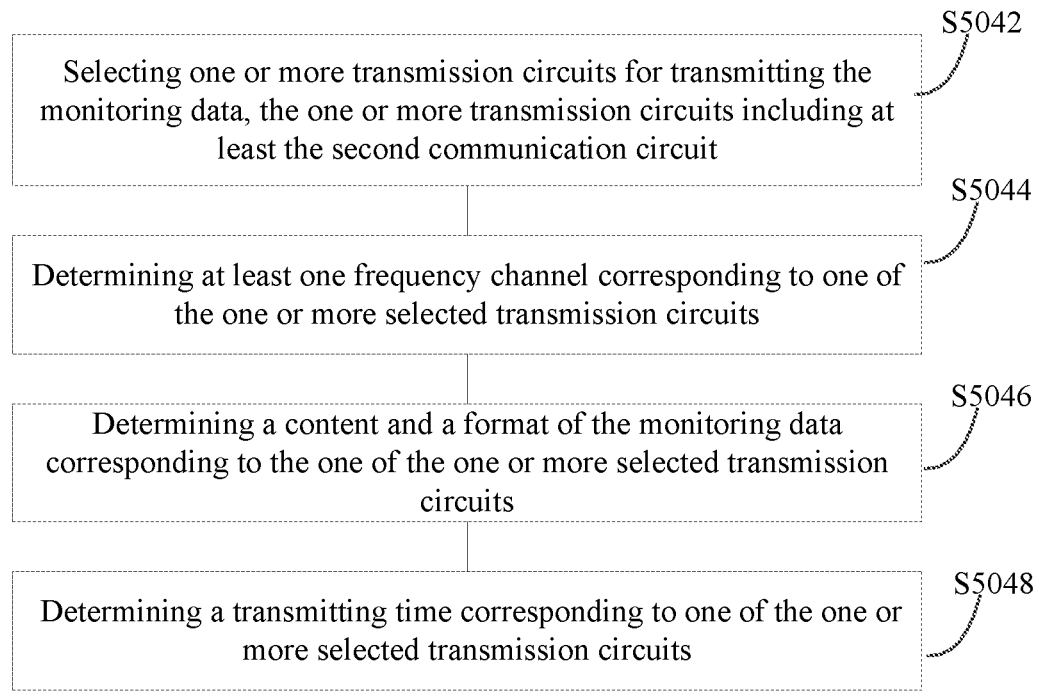
FIG. 6 is a flow chart of a process for determining a monitoring data transmission scheme according to an exemplary embodiment of the present disclosure.

The present disclosure further provides a monitoring method applicable to a communication device that includes two communication circuits. FIGS. 4-6 are flow charts depicting various embodiments of the disclosed monitoring method. The disclosed method may be implemented by the first communication device 102 in accordance with FIG. 1 and/or the communication device 200 in accordance with FIG. 2 described above.

FIG. 4 is a flow chart of a monitoring method according to an exemplary embodiment of the present disclosure. The method includes: effecting, by a first communication circuit of a communication device, communication of working data associated with normal operations of the communication device at a first frequency channel (S402); and transmitting monitoring data associated with monitoring the communication device at a second frequency channel (S404). In some embodiments, the monitoring data can be transmitted substantially concurrently with effecting the communication of the working data In some embodiments, the communication of the working data is implemented by a first communication circuit of the communication device; and the monitoring data is transmitted by a second communication circuit of the communication device. In some embodiments, the first frequency channel (e.g., the working frequency channel 106) is in a first frequency band, and the second frequency channel (e.g., the stand-by frequency channel 108) is a frequency channel in the first frequency band that does not overlap with the first frequency channel, or a frequency channel in a second frequency band that is different from the first frequency band. In some embodiments, the second communication circuit may transmit the monitoring data at multiple second frequency channels that are different from the first frequency channel. In some embodiments, the first frequency band and/or the second frequency band are within the unlicensed spectrum, such as 2.4 GHz-band and/or 5.8 GHz-band.

In some embodiments, the working data associated with normal operations of the communication device is transmitted between the communication device and a linked device. The linked device refers to a device that is wirelessly connected to the first communication circuit at the first frequency channel. For example, the communication device can be the first communication device 102 shown in FIG. 1 and the linked device can be the second communication device 104 shown in FIG. 1. The working data associated with normal operations of the communication device may include sensor data and/or control data of at least one of the communication device, an object that integrates the communication device, an object that is connected to the communication device, the linked device, an object that integrates the linked device, or an object that is connected to the linked device.

In some embodiments, the monitoring data associated with monitoring the communication device is broadcasted at the second frequency channel such that one or more detectors within a range of the second communication circuit can receive the monitoring data. The monitoring data associated with monitoring the communication device may include at least a location of the communication device and/or a location of the linked device. For example, the communication device can be the first communication device 102 shown in FIG. 1 and the one or more detectors can be the one or more monitoring detectors 105 shown in FIG. 1. Further, the one or more detectors may communicate with the monitoring server 112 to implement any proper monitoring and/or regulations on the communication device.

FIG. 5 is a flow chart of a monitoring method according to another exemplary embodiment of the present disclosure. As shown in FIG. 5, the communication device can obtain at least one of communication data from a monitoring detector, a transmission rule, a communication quality between the second communication circuit and the monitoring detector, an impact on working data transmission imposed by a transmission of the monitoring data, or a comparison result between a link budget of the first communication circuit and a link budget of the second communication circuit (S502). A monitoring data transmission scheme can be determined based on the at least one of the communication data from the monitoring detector, the transmission rule, the communication quality, the impact on the working data transmission, or the comparison result (S504). The communication device can transmit the monitoring data according to the monitoring data transmission scheme (S506).

In some embodiments, the communication device may receive communication data from a monitoring detector. The communication data may include at least one of a request for information related to the mobile object, a request for changing operation channel of the communication device, a control command related to the mobile object, or data related to the monitoring detector.

For example, the communication data may indicate a frequency channel or a frequency band that can be used by the communication device for transmitting the monitoring data. The communication data may further indicate a content to be included in the monitoring data, a format of the monitoring data, and/or a transmitting time of the monitoring data. The communication device can adjust the monitoring data transmission scheme based on requirements specified in the communication data from the monitoring detector (e.g., after verifying the source of the communication data).

In some embodiments, when the communication data requests information related to the mobile object, the communication device may gather the requested information and transmit the information to the monitoring detector by the second communication circuit. In other words, instead of transmitting the monitoring data in default content, the second communication circuit may transmit the requested information as updated monitoring data to the monitoring detector.

In some embodiments, the data related to the monitoring detector may facilitate the communication device to determine whether an interference exists near the monitoring detector and adjust the monitoring data transmission scheme based on such data. In some embodiments, the control command related to the mobile object may be processed by the communication device and implemented on the mobile object, such as reducing a speed of the mobile object, making the mobile object to fly/hover at a specific altitude, landing the mobile object at certain spot, etc.

The transmission rule may be preconfigured and stored in the first communication device 102. In some embodiments, the transmission rule may indicate at least part of the monitoring data transmission scheme based on a type and/or a priority level of the monitoring data being transmitted. For example, the transmission rule may specify different transmission schemes for identification type monitoring data (e.g., model number, registration ID) and sensing type monitoring data (e.g., data collected by one or more sensors). Their respective transmission schemes may differ in transmission channel, transmission format, and/or transmission frequency. For example, monitoring data with a higher priority level is transmitted more frequently than monitoring data with a lower priority.

In some embodiments, the transmission rule may indicate at least part of the monitoring data transmission scheme based on laws and regulations. For example, laws and regulations in certain geographical location or jurisdiction area may require more frequent update of monitoring data than others. The communication device can obtain geographical coordinates of current location and determine at least part of the monitoring data transmission scheme based on prestored regulatory requirements of an area covering the current location. In some embodiments, the transmission rule may also specify the monitoring data transmission scheme based on different surrounding environments (e.g., detected weather condition, channel condition, etc.).

In some embodiments, the communication device and/or the monitoring detector may evaluate a communication quality between the second communication circuit and the monitoring detector. One or more indicators of the communication quality can be obtained, such as noise, interference, signal-to-noise ratio, error rate, fading rate, throughput, latency, bandwidth, etc. When the communication quality meets a quality threshold, the communication device may determine that the monitoring data transmission scheme includes assigning the second communication circuit to continue transmitting the monitoring data at the second frequency channel. When the communication quality does not meet a quality threshold, the communication device may adjust the monitoring data transmission scheme by, for example, assigning the second communication circuit to transmit the monitoring data at the third frequency channel different from the second frequency channel, and/or, assigning both the first communication circuit and the second communication circuit to transmit the monitoring data.

In some embodiments, the communication device may determine an impact on working data transmission imposed by a transmission of the monitoring data. That is, when determining whether to transmit the monitoring data by the first communication circuit, the impact on the working data transmission is considered. The first communication circuit transmits the monitoring data along with the working data, and the impact on the working data transmission may include increasing the load on the first frequency channel and reducing the throughput of the working data transmission. When the impact is below certain impact threshold, normal working data transmission is not affected, and the communication device may determine that the first communication circuit has the capacity to transmit the monitoring data. When the impact is below certain impact threshold, normal working data transmission is not affected, and the communication device may determine that the first communication circuit has the capacity to transmit the monitoring data.

In some embodiments, the communication device may obtain a comparison result between a link budget of the first communication circuit and a link budget of the second communication circuit. For example, such comparison result may be predetermined based on the communication protocols implemented by the two communication circuits and/or hardware components (e.g., antenna type) of the communication circuits. A link budget may reflect all gains and losses from a transmitter to a receiver, and may reflect, e.g., an effective signal transmission distance between the transmitter and the receiver. That is, the first or second communication circuit needs to transmit signals at certain transmission power in order for the monitoring detector to effectively receive the transmitted signals. By transmitting the monitoring data using a communication circuit having a higher link budget, the monitoring data can be received by monitoring detectors in a wider range, and a monitoring/transmission distance of the communication circuit is greater. For example, the first communication circuit may implement 802.11 standard Wi-Fi communication at 2.4 GHz-band, which may have an outdoor monitoring distance of about 1 kilometers; and the second communication circuit may implement SDR techniques at 5.8 GHz-band, which may have an outdoor monitoring distance of about 5 kilometers. In some embodiments, a communication circuit having a higher link budget (e.g., a longer monitoring distance) is selected for transmitting the monitoring data.

By selecting a communication circuit having a higher link budget, the monitoring data can be transmitted to monitoring detectors located in a wider distance range. Further, by transmitting the monitoring data from both communication circuits at two or more channels, the monitoring data can be received by more monitoring detectors. For example, the working data communication can be implemented by the first communication circuit based on the 802.11 standard Wi-Fi communication at a first frequency channel, and the monitoring data can be transmitted by the second communication circuit based on SDR techniques at a second frequency channel. If the first communication circuit further transmits the monitoring data at the first frequency channel, practicality and effectiveness of monitoring the communication device can be improved because the monitoring data is transmitted by one more circuit at more channels. In the scenario that the first communication circuit does not transmit the monitoring data, if the second communication circuit has a higher link budget, effectiveness of monitoring the communication device can still be improved, and the monitoring data communication will not cause interference with the working data communication and will not occupy resources for the working data communication. As a result, regular operations of the mobile object can be enhanced. In the scenario that the first communication circuit transmits the monitoring data at a rate lower than a designated rate, if the second communication circuit has a higher link budget, effectiveness of monitoring the communication device can be improved, and the interference by the monitoring data communication with the working data communication can be reduced and more resources can be allocated to the communication of the working data. As a result, the regular operations of the mobile object can be enhanced In some embodiments, a combination of two or more of the factors described above are evaluated to determine the monitoring data transmission scheme. For example, weights may be assigned to these factors and an overall evaluation may be obtained accordingly.

FIG. 6 is a flow chart of a process for determining a monitoring data transmission scheme according to an exemplary embodiment of the present disclosure. The monitoring data transmission scheme may include any proper information related to transmitting the monitoring data. As shown in FIG. 6, determining the monitoring data transmission scheme (e.g., S504 in FIG. 5) may include selecting one or more transmission circuits for transmitting the monitoring data (S5042). That is, instead of or in addition to transmitting the monitoring data by the second communication circuit, the communication device may further determine whether to transmit the monitoring data by the first communication circuit.

In some embodiments, the first communication circuit may be selected to transmit the monitoring data in one or more of the following situations: an interference exists at the second frequency channel, an impact on the working data transmission imposed by a transmission of the monitoring data is below an impact threshold, the first communication circuit has a higher link budget than the second communication circuit (e.g., a wider effective range for signal transmission), and a controlling command from the monitoring detector is received that requires the monitoring data to be sent at a frequency channel or a format supported by the first communication circuit.

In some embodiments, when a communication quality between the second communication circuit and the monitoring detector is above a quality threshold (e.g., no interference exists at the second frequency channel or the interference is low), and/or an impact on the working data transmission imposed by the transmission of the monitoring data is above the impact threshold (e.g., transmitting the monitoring data would occupy valuable resources for transmitting working data), the first communication circuit is not selected for transmitting the monitoring data.

In some embodiments, determining the monitoring data transmission scheme may include determining at least one frequency channel corresponding to one of the one or more selected transmission circuits (S5044). For example, given that the working data is transmitted at the first frequency channel by the first communication circuit, the second frequency channel corresponding to the second communication circuit may be determined by avoiding channels that overlap the first frequency channel or by selecting a channel that is in a different frequency band than the first frequency channel. If the first communication circuit is also selected for transmitting the monitoring data, a frequency channel corresponding to the first communication circuit may be determined as the first frequency channel, which can be used to transmit both the working data and the monitoring data.

In some embodiments, determining the monitoring data transmission scheme may include determining a content and a format of the monitoring data corresponding to the one of the one or more selected transmission circuits (S5046). For example, the format of the monitoring data, such as encoding scheme and modulation method of the monitoring data, may be preconfigured based on the communication protocols supported by corresponding communication circuit. The content of the monitoring data may be determined based on a preconfigured default format, a data length allowed to be transmitted in current channel condition and communication capacity, and/or requirements sent by the monitoring detector. When both the first communication circuit and the second communication circuit are selected to transmit the monitoring data, the contents and/or formats of the monitoring data transmitted by the two communication circuits may or may not be the same.

In some embodiments, determining the monitoring data transmission scheme may include determining a transmitting time corresponding one of the one or more selected transmission circuits (S5048). Being a communication circuit that does not transmit the working data, the second communication circuit may transmit the monitoring data at any proper fixed or variable time intervals, or in response to a probe request from the monitoring detector. The first communication circuit, on the other hand, if being selected, may require a coordinated schedule for transmitting the monitoring data and the working data.

In some embodiments, the communication device may determine a rate/frequency for the first communication circuit to transmit the monitoring data. The rate may be less than or equal to a designated rate. The designated rate, as used herein, is configured for the first communication circuit based on time slots assigned for transmitting the monitoring data and time slots assigned for transmitting the working data at each communication cycle of the first communication circuit when the second communication circuit is not available (e.g., a rate required by regulations). For example, each communication cycle may include 40 time slots, among which 6 time slots may be assigned to transmit the monitoring data, and the remaining time slots may be assigned to transmit the working data. In this example, the designated rate may be 6/40.

In some embodiments, when an impact on working data transmission imposed by transmission of the monitoring data is below a first impact threshold and above a second impact threshold, the communication device may determine to transmit the monitoring data by the first communication circuit at a target rate lower than the designated rate. When the impact is below the second impact threshold, the communication device may determine to transmit the monitoring data by the first communication circuit at the designated rate.

In some embodiments, the impact on the working data transmission imposed by transmission of the monitoring data may be determined based on the bandwidth at the first frequency channel and/or data volume of to-be-transmitted working data. For example, when the bandwidth is enough for transmitting the working data and the monitoring data, the impact may be determined as low or zero; and when the bandwidth is not enough or just enough for transmitting the working data, the impact may be determined as high. The communication device may further consider other factors to evaluate the impact, such as volume of the monitoring data and channel condition at the first frequency channel. In some embodiments, the communication device may determine the target rate according to current load at the first frequency channel. For example, the target rate for transmitting the monitoring data may be inversely correlated to the current load such that transmitting the monitoring data is affordable without affecting the working data transmission.

The present disclosure provides a monitoring method and system applicable for a communication device containing two communication circuits. Comparing to using a single communication circuit for transmitting both the working data and monitoring data, when only the second communication circuit is transmitting the monitoring data or when the first communication circuit is transmitting the monitoring data at a rate lower than the designated rate, the load on the first frequency channel is reduced, the impact of monitoring data transmission imposed on working data transmission is reduced or even removed, and communication quality and performance of the mobile object can be improved. When both communication circuits are selected for transmitting the monitoring data, the monitoring data are transmitted at two different channels, such that improved accessibility and efficiency for monitoring the mobile object can be achieved. Further, the monitoring distance can be extended when the link budget of the second communication circuit is greater than that of the first communication circuit.

The processes shown in the figures associated with the method embodiments can be executed or performed in any suitable order or sequence, which is not limited to the order and sequence shown in the figures and described above. For example, two consecutive processes may be executed substantially simultaneously where appropriate or in parallel to reduce latency and processing time, or be executed in an order reversed to that shown in the figures, depending on the functionality involved.

Further, the components in the figures associated with the device embodiments can be coupled in a manner different from that shown in the figures as needed. Some components may be omitted and additional components may be added.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A control method, performed by a first communication circuit, comprising:
   in one communication cycle that comprises multiple time slots:
      transmitting, using a first communication protocol, working data associated with operations of a mobile object from the mobile object to a remote control of the mobile object at a first number of first time slots in the multiple time slots of the communication cycle of the first communication circuit; and
      transmitting, using a second communication protocol different from the first communication protocol, monitoring data of the mobile object associated with monitoring the mobile object from the mobile object to a monitoring detector at a second number of second time slots in the multiple time slots of the same communication cycle of the first communication circuit, the second time slots being different from the first time slots, wherein the monitoring detector received the monitoring data is an entity different from the remote control received the working data.

2. The method of claim 1, wherein:
   one of the first communication protocol and the second communication protocol is a proprietary communication protocol; and
   the other one of the first communication protocol and the second communication protocol is a public communication protocol.

3. The method of claim 1, wherein:
the monitoring data of the mobile object comprises at least one of a location of the mobile object, a speed of the mobile object, an orientation of the mobile object, or a location of the remote control of the mobile object.

4. The method of claim 3, wherein:
the monitoring data of the mobile object further comprises at least one of control data, sensor data, telemetry data, or payload data of the mobile object.

5. The method of claim 3, wherein:
the monitoring data of the mobile object further comprises identification information of the mobile object.

6. The method of claim 1, wherein:
the monitoring detector comprises at least one of a radiofrequency (RF) detector in association with a remote server, another mobile object, or a remote control of the another mobile object.

7. The method of claim 1, wherein:
the communication of the working data is implemented by a first communication circuit of the communication device, and the monitoring data is transmitted by a second communication circuit of the mobile object.

8. The method of claim 7, further comprising:
receiving, by the second communication circuit, communication data from the monitoring detector.

9. The method of claim 8, wherein:
the communication data comprises at least one of a request for information related to the mobile object, a request for changing operation channel of the communication device, a control command related to the mobile object, or data related to the monitoring detector.

10. The method of claim 8, further comprising:
determining whether to transmit the monitoring data by the first communication circuit based on the communication data from the monitoring detector.

11. The method of claim 7, further comprising:
determining whether to transmit the monitoring data by the first communication circuit based on at least one of a communication quality between the second communication circuit and the monitoring detector, an impact on working data transmission imposed by a transmission of the monitoring data, a comparison result between a link budget of the first communication circuit and a link budget of the second communication circuit.

12. The method of claim 11, further comprising:
in response to the communication quality is above a quality threshold, determining not to transmit the monitoring data by the first communication circuit; and
in response to the communication quality is below the quality threshold, determining to transmit the monitoring data by the first communication circuit.

13. The method of claim 11, further comprising:
in response to the impact is below a first impact threshold, determining to transmit the monitoring data by the first communication circuit; and
in response to the impact is above the first impact threshold, determining not to transmit the monitoring data by the first communication circuit.

14. The method of claim 11, wherein:
the impact on the working data transmission imposed by the transmission of the monitoring data is determined according to network performance at the first frequency channel, the network performance comprising at least one of a bandwidth, a throughput, a latency, or an error rate.

15. The method of claim 11, further comprising:
determining to transmit the monitoring data by the first communication circuit in response to the link budget of the first communication circuit is greater than the link budget of the second communication circuit; and
determining not to transmit the monitoring data by the first communication circuit in response to the link budget of the first communication circuit is less than or equal to the link budget of the second communication circuit.

16. The method of claim 1, further comprising:
determining a monitoring data transmission scheme based on at least one of:
selecting one or more transmission circuits for transmitting the monitoring data, the one or more transmission circuits including at least a communication circuit;
determining at least one frequency channel corresponding to one of the one or more transmission circuits;
determining a content and a format of the monitoring data corresponding to the one of the one or more transmission circuits; or
determining a transmitting time corresponding to the one of the one or more transmission circuits; and
transmitting the monitoring data according to the monitoring data transmission scheme.

17. The method according to claim 1, wherein:
the second number of second time slots is determined based on a designated rate between an assigned number of the second time slots and a total number of the multiple time slots.

18. The method according to claim 1, wherein:
the monitoring data transmitted to the monitoring detector is not the same as the working data transmitted to the remote control of the mobile object.

19. A control device, comprising:
one or more processors; and one or more memories coupled to the one or more processors and storing instructions that, when executed by the one or more processors, cause the one or more processors to:
effect, using a first communication protocol, communication of working data associated with operations of a mobile object from the mobile object to a remote control of the mobile object at a first time slot of a first communication circuit;
determining a monitoring data transmission scheme based on at least one of:
determining at least one frequency channel corresponding to one of the one or more transmission circuits;
determining a content and a format of the monitoring data corresponding to the one of the one or more transmission circuits; or
determining a transmitting time corresponding to the one of the one or more transmission circuits; and
transmit, using a second communication protocol different from the first communication protocol and according to the monitoring data transmission scheme, a monitoring data of the mobile object associated with monitoring the mobile object from the mobile object to a monitoring detector at a second time slot of the first communication circuit, wherein the monitoring data is used by the monitoring detector for monitoring activities of the mobile object, the monitoring detector received the monitoring data is an entity different from the remote control received the working data.

* * * * *